2,281,163

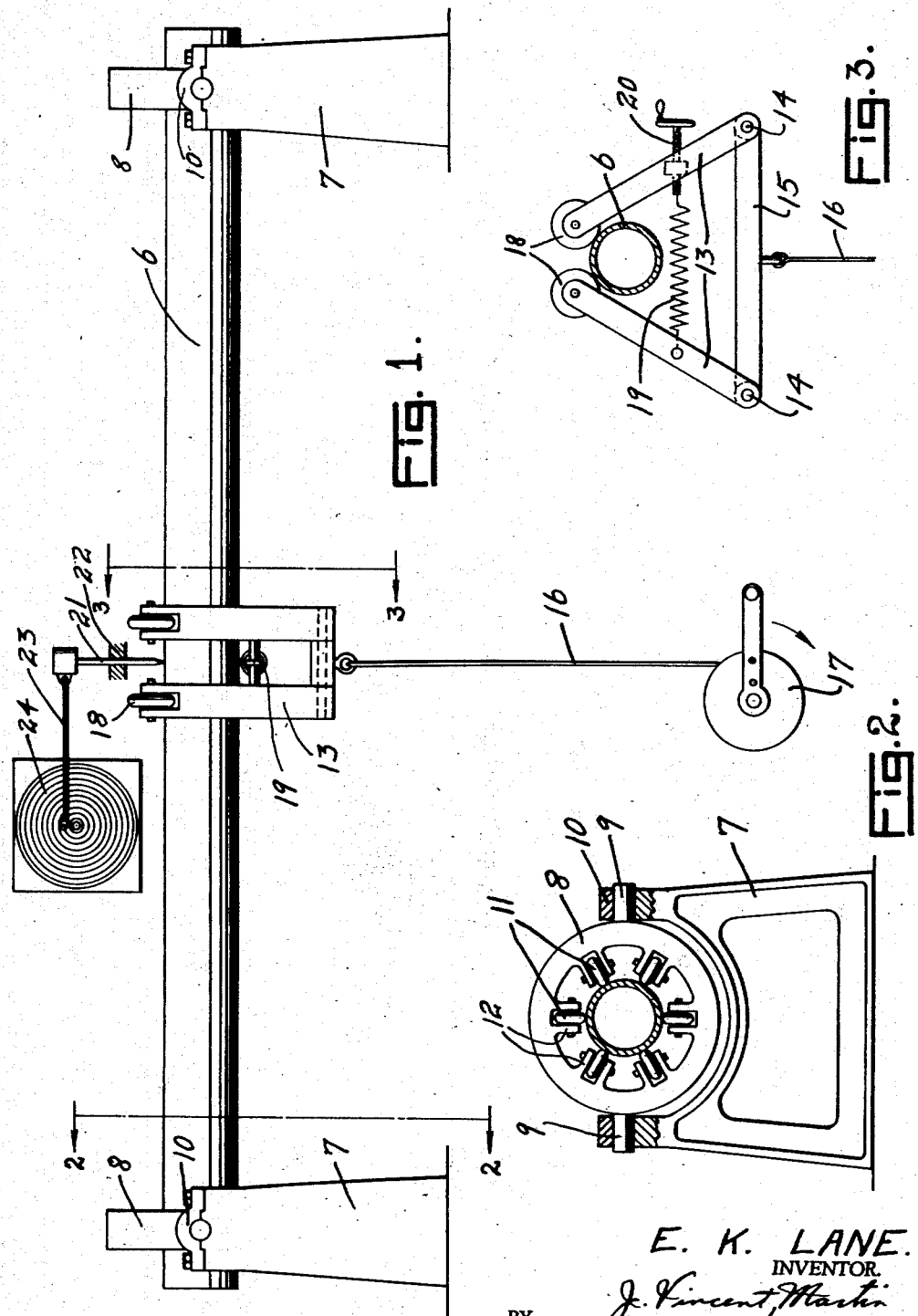
April 28, 1942. E. K. LANE 2,281,163
APPARATUS FOR DETERMINING THE DEGREE OF
FATIGUE IN DRILL PIPE AND THE LIKE
Filed July 19, 1940
E. K. LANE.
INVENTOR.
BY
ATTORNEYS Patented Apr. 28, 1942

UNITED STATES PATENT OFFICE 2,281,163

APPARATUS FOR DETERMINING THE DEGREE OF FATIGUE IN DRILL PIPE AND THE LIKE

Edward K. Lane, Houston, Tex.

Application July 19, 1940, Serial No. 346,330

3 Claims. (Cl. 73—51)

This invention relates to a means for determining the degree of fatigue or so-called crystallization present in drill pipes.

It is well known that drill pipe in use is constantly being flexed first in one direction and then in the other and that this constant flexing over a long period of use eventually results in a fatigue or break down of the material of the pipe. The drill stem then breaks off and it is necessary to do a fishing job.

This invention provides a means for testing sections of drill pipe in order to determine to what extent the fatigue has progressed in the drill pipe and thus to determine whether or not the drill pipe is safe for further service.

The invention resulted from experience in straightening drill pipe. It is possible to tell, after one has acquired a great deal of experience in straightening a drill pipe, whether the pipe being straightened is safe for further use, by the amount of resiliency which the pipe displays during the straightening operation. If the pipe is resilient and tends to return to its original position after being deflected, then it is in relatively good condition, but if it tends to take relatively easily such set as may be imparted to it by the pipe straightening equipment, then it is not in good shape and should not be used further.

The method just outlined, however, is extremely uncertain principally because the deflection of drill pipe in a straightening machine is relatively small and the degree of deflection depends entirely upon the judgment of the operator, and further because the amount of resilience is determined only by the observation and skill of the operator. In order to remove this uncertainty and provide a method which can be relied upon, this invention proposes in one form to support a section of drill pipe at predetermined points adjacent its ends, and then to deflect the drill pipe by a steady pull in one direction at a predetermined point intermediate its ends until it is being deflected with a predetermined force, and then to suddenly release the drill pipe. The movements of the drill pipe upon release are then recorded by some electrical or mechanical detecting apparatus, which will indicate the exact movements of the drill pipe following its release. Knowing the exact force used in the deflection, and being able to determine by the graph the amount of deflection produced by that force, the amount of rebound due to the resilience of the pipe when the pipe is released, and the length of time during which the vibration of the pipe continues, one is given an exact indication of the resilience of the pipe and from this one can determine with a high degree of accuracy to just what extent the pipe may have been fatigued.

The detecting means for detecting movements of the pipe may be of any suitable form and may be located so as to contact the pipe and detect lateral movements of the pipe adjacent its central portion or to contact the pipe and detect endwise movements of the pipe at one end thereof, the other end being fixed.

In the accompanying drawing Fig. 1 is a partly diagrammatic elevation of one form of apparatus which may be used in performing the process;

Figs. 2 and 3 are respectively sections on the lines 2—2 and 3—3 of Fig. 1.

Referring to the drawing 6 indicates the drill pipe section to be tested, supported at each end by a structure consisting of an upright frame 7 carrying a bearing ring 8 having pivots 9 mounted in bearings 10 at the top of the frame, and each bearing ring supports an internal circular series of rollers 11 between ears 12 projecting from the ring, a pipe 6 resting against and between the rollers so that it may move endwise or vibrate in a vertical plane about its points of support.

To produce the deflection and start the vibration a deflector device may be used comprising pairs of arms 13 pivoted at 14 to opposite ends of a bar 15 connected by a cable 16 to a winding drum 17. The arms have rollers 18 at their upper ends which press upon the middle portion of the pipe 6 by the stress imposed by a spring 19 adjustable by a screw 20 which connects the respective arms. The middle part of the pipe 6 may be pulled down by the deflector described and when the down pull exceeds the amount determined by the spring the rollers 18 will slip off the pipe and release it. The pipe will thus be deflected by a predetermined force and its vibrations due to such deflection may be noted.

To indicate the vibrations an indicator is shown comprising a pin 21 working through a support 22 and bearing at its lower end against the pipe 6 adjacent the deflector, and connected at its upper end to a stylus 23 which will mark vibrations on a chart 24 or other recording device which will thus indicate graphically and visibly the extent and number of vibrations of the pipe after its deflection and sudden release.

Obviously the invention may be embodied in various other forms and the method performed by different apparatus, and no limitation in this respect is implied by reason of the particular apparatus illustrated.

Having described my invention, I claim:

1. An apparatus for indicating the fatigue of a pipe or the like, comprising a pair of spaced supports each having a pivoted part adapted to embrace a pipe or the like and prevent lateral movement thereof at the point embraced while permitting pivotal and longitudinal movement thereof at said point, and means adapted to engage said pipe or the like intermediate said supported points to apply a lateral force thereto for deflecting the same, said last mentioned means being releasable from said pipe by the application of a predetermined deflecting force to the pipe therethrough.

2. In an apparatus of the character described, means for causing lateral deflection of a pipe or the like, said means comprising a pair of rollers having their axes substantially parallel to each other, means supporting said rollers for movement toward and away from each other, means for yieldably urging said rollers toward each other at all times, and means for applying a force to the support of said rollers in a direction substantially at right angles to a line between the axes of said rollers.

3. In an apparatus of the character described, means for applying a predetermined lateral force to a pipe or the like, said means comprising a beam, a pair of arms pivotally connected to the opposite ends of said beam whereby their free ends may move toward and away from each other, a pair of rollers adjacent the free ends of said arms having their axes substantially parallel to each other, a spring extending between said arms at a position spaced from the free ends thereof for constantly urging the free ends toward each other, and means for applying a force to said beam in a direction away from the free ends of said arms.

EDWARD K. LANE.